July 28, 1964
J. R. REED, JR
3,142,424
GUN HOLDER FOR BICYCLES
Filed Jan. 30, 1962
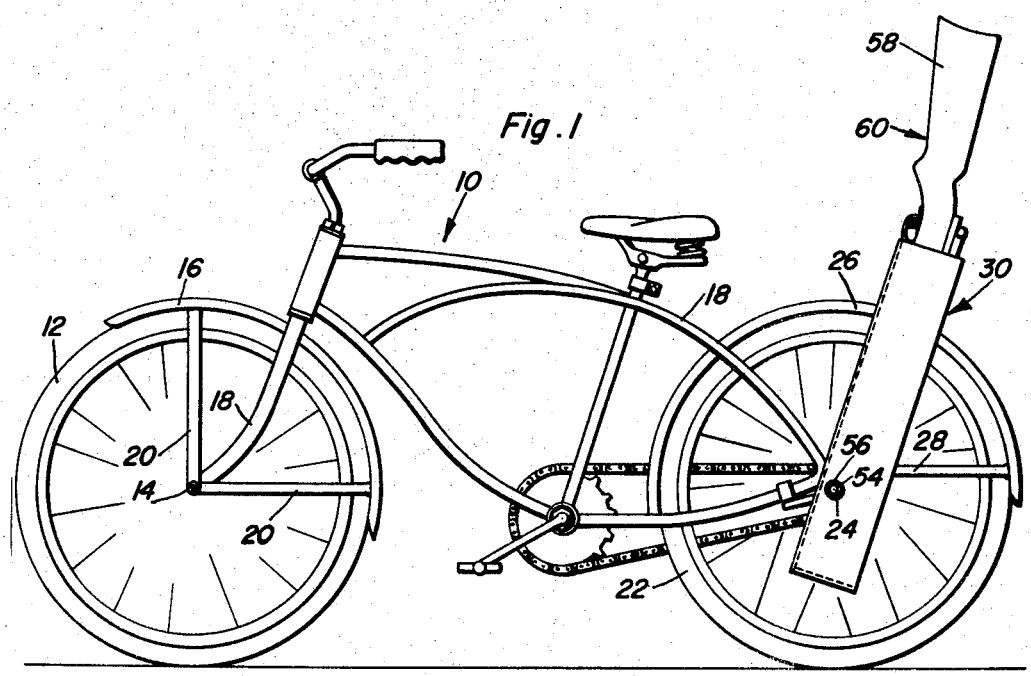
Fig. 1
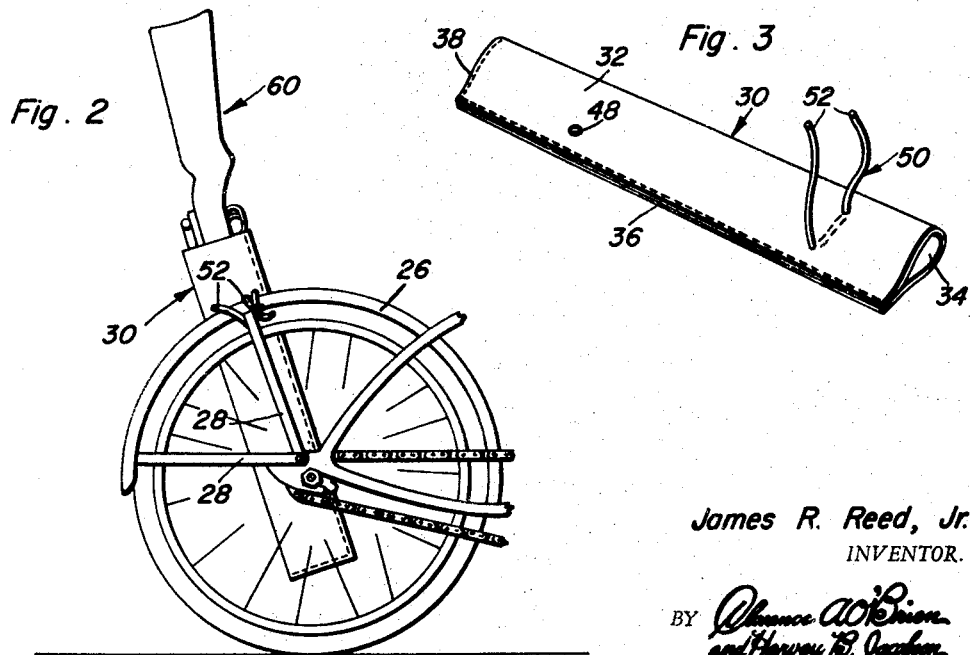
Fig. 2
Fig. 3
James R. Reed, Jr.
INVENTOR.

United States Patent Office 3,142,424
Patented July 28, 1964

3,142,424
GUN HOLDER FOR BICYCLES
James R. Reed, Jr., 1112 Plaza, El Campo, Tex.
Filed Jan. 30, 1962, Ser. No. 169,836
1 Claim. (Cl. 224—32)

The present invention relates generally to bicycles, and more particularly to gun holders secured to bicycles.

One of the basic deficiencies in traveling by bicycle is the difficulty in carrying articles, especially elongated articles such as rifles. In addition to the problem of supporting the rifle while riding a bicycle, which normally requires the use of both hands, the danger of accidental discharge of the weapon is an important factor to be considered.

The present invention is concerned with a device which allows a bicycle rider to conveniently and safely carry a rifle along with him. This device consists essentially of an elongated scabbard, boot or holder secured in a substantially upright position on either the front or rear axle and fender out of the way of the rider. The device is easily adapted to be formed economically out of a wide range of materials, for example, the device could be formed from cardboard to carry a toy rifle or BB gun on a child's bicycle, or the device could be formed of heavy plastic or leather for use on either a regular bicycle or a motorized bicycle by either hunters or law enforcement officers.

Accordingly, one of the primary objects of the present invention is the provision of a device mounted on the bicycle for conveniently and safely carrying a rifle.

Another object is the provision of a device which has a wide range of uses, from a support from a toy rifle on a child's bicycle, to a support for an actual weapon on a motorized bicycle.

An additional object of the present invention is the provision of a device which is capable of being mounted at various angles enabling the device to be located for a quick draw if so desired.

A further object of the present invention is to provide a device which is both simple in construction and economical to manufacture.

Likewise, an object of the present invention is to provide a gun holder which can be quickly and easily installed and removed from a standard bicycle.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of a bicycle with the gun holder mounted on the rear of the bicycle;

FIGURE 2 is a partial side elevational view of the rear of the bicycle in FIGURE 1 illustrating the reverse side of the bicycle and the manner in which the tie member is secured; and FIGURE 3 is a perspective view of the gun holder of the present invention.

Referring now more particularly to the drawings, reference numeral 10 generally designates a bicycle having a front wheel 12 rotatably mounted on a front axle 14, a front fender 16 mounted on the bicycle frame 18 by extending braces 20, a rear wheel 22 rotatably mounted on a rear axle 24, and a rear fender 26 mounted on the bicycle frame 18 by braces 28.

The gun holder of the present invention is generally designated by reference numeral 30 and comprises an integral sheet of material 32 folded so as to form an aperture 34 which extends longitudinally and is tapered in cross-section as best shown in FIGURE 3. The integral sheet of material 32 can be of any suitable material such as cardboard, plastic or leather. The longitudinal edges 36 of the sheet of material 32, as well as the bottom ends 38 of said material are secured together by any convenient means such as stitching, gluing, or stapling. An aperture 48 is formed in the gun holder adjacent the edge 36 and near the lower end 38. A tying means 50 having extending ends 52 is secured to one side of the gun holder adjacent its upper end. This tying means can be of any suitable material such as rope, string, plastic, or leather.

As shown in FIGURE 1, the gun holder 30 is mounted on the rear axle 24 of the bicycle 10 by insertion of the rear axle 24 through the aperture 48 in the gun holder and by then applying a washer 54 and a nut 56 to the extending end of the axle 24 so as to secure the gun holder 30 thereon. The nut and washer used can either be the original nut and washer used to secure the axle 24 to the frame or they can be an additional nut and washer applied to an extending end of the axle. If so desired, other attaching means, such as for example a cotter pin, can be used.

With reference to FIGURE 2, it will be noted that the upper end of the gun holder is secured to the bicycle 10 by extending the ends 52 of the tying means 50 over the fender 26 and tying the ends 52 around the fender brace 28. As is readily apparent, the angle at which the gun holder 30 extends can be varied by securing the upper tie member 50 at various different locations to various projections such as a standard type rear luggage carrier (not shown). This enables the butt 58 of the rifle 60 to be placed in any position desired by the rider of the bicycle 10. If so desired, the gun holder 30 can be mounted on the front axle and front fender of the bicycle in a manner similar to the rear mounting noted supra.

As is readily apparent from the construction of the holder of the present invention, other elongated articles, such as fishing rods, can also be carried in the device. Further, if desired, the holder 30 can be tapered from the upper end to the lower end. Also, a simple U-shaped clamp (not shown) adapted to fit over the top of the fenders, may be substituted for the tying means 50.

From the foregoing, it is apparent that a novel bicycle gun holder has been defined. The gun holder of the present invention is secured to a standard bicycle frame by insertion of either the front or rear axle through an aperture near the lower end of the holder, securing said axle to said holder, and lastly securing the upper end of the holder adjacent the corresponding fender at any angle desired by the rider of the bicycle.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A gun holder for attachment to a bicycle, comprising an integral sheet of material folded in half about its longitudinal axis so as to form an aperture tapered in cross-section from its widest portion adjacent the fold to its narrowest portion adjacent the meeting edges thereof so as to snugly receive a gun, means securing the meeting edges together, second means closing one end of the gun holder, aligned apertures through the sides of the gun holder adjacent the meeting edges near the closed end, and an elongated tying means having extending ends and a center section thereof secured to the sheet of material by insertion through aligned holes in one of the sides of said sheet forming the tapered aperture, said gun holder being positionable on the rear wheel of a bicycle with the axle of the wheel extending through the aligned apertures and the holder orientated so as to project upwardly and rearwardly therefrom, said holder being of a length so as to position the upper end thereof above the fender of the wheel for ease of access thereto for removal and replacement of a gun by a rider on the bicycle, the center of the tying means being located at approximately the top of the fender.

References Cited in the file of this patent

UNITED STATES PATENTS

| | | |
|---|---|---|
| 309,292 | Browne | Dec. 16, 1884 |
| 1,963,333 | Morales | June 19, 1934 |

FOREIGN PATENTS

| | | |
|---|---|---|
| 17,861 | Great Britain | of 1902 |
| 897,646 | France | May 30, 1944 |